United States Patent
Tada et al.

(10) Patent No.: US 12,502,198 B2
(45) Date of Patent: Dec. 23, 2025

(54) MEDICAL DEVICE

(71) Applicant: TERUMO KABUSHIKI KAISHA, Tokyo (JP)

(72) Inventors: Yuichi Tada, Santa Clara, CA (US); Yoichiro Kuwano, Machida Tokyo (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 431 days.

(21) Appl. No.: 18/081,658

(22) Filed: Dec. 14, 2022

(65) Prior Publication Data

US 2023/0200843 A1 Jun. 29, 2023

(30) Foreign Application Priority Data

Dec. 28, 2021 (JP) ................... 2021-213849

(51) Int. Cl.
*A61B 17/3207* (2006.01)
*A61B 5/00* (2006.01)
*A61B 5/0215* (2006.01)
*A61B 17/22* (2006.01)

(52) U.S. Cl.
CPC .. *A61B 17/320758* (2013.01); *A61B 5/02158* (2013.01); *A61B 5/4836* (2013.01); *A61B 2017/22038* (2013.01); *A61B 2017/22079* (2013.01)

(58) Field of Classification Search
CPC .... A61B 17/320758; A61B 17/320725; A61B 17/32075; A61B 17/320783; A61B 2017/22094; A61B 2017/22038; A61B 2017/22041; A61B 5/4836

See application file for complete search history.

(56) References Cited

U.S. PATENT DOCUMENTS

| 6,295,990 | B1 * | 10/2001 | Lewis | A61B 17/22 604/509 |
| 2010/0292721 | A1 | 11/2010 | Moberg | |
| 2014/0236118 | A1 * | 8/2014 | Unser | A61B 18/1492 606/41 |
| 2015/0141853 | A1 * | 5/2015 | Miller, III | A61B 5/02158 600/481 |
| 2020/0046403 | A1 * | 2/2020 | Piippo Svendsen | A61B 17/32002 |

FOREIGN PATENT DOCUMENTS

JP 5281195 A 9/2013

* cited by examiner

*Primary Examiner* — Tuan V Nguyen
(74) *Attorney, Agent, or Firm* — Kim & Stewart LLP

(57) ABSTRACT

A medical device for removing an object in a body cavity, includes a first device including a rotatable drive shaft and a cutter attached to a distal end of the drive shaft and by which the object is cut, a second device movable with respect to the drive shaft along a longitudinal direction of the drive shaft and including a distal-side blood pressure sensor at a distal portion of the second device and a proximal-side blood pressure sensor on a proximal side of the distal-side blood pressure sensor, and a controller configured to acquire a first measurement value from the distal-side blood pressure sensor and a second measurement value from the proximal-side blood pressure sensor, calculate a fractional flow reserve using the first and second measurement values, and control the cutter to cut the object in accordance with the calculated fractional flow reserve.

14 Claims, 4 Drawing Sheets

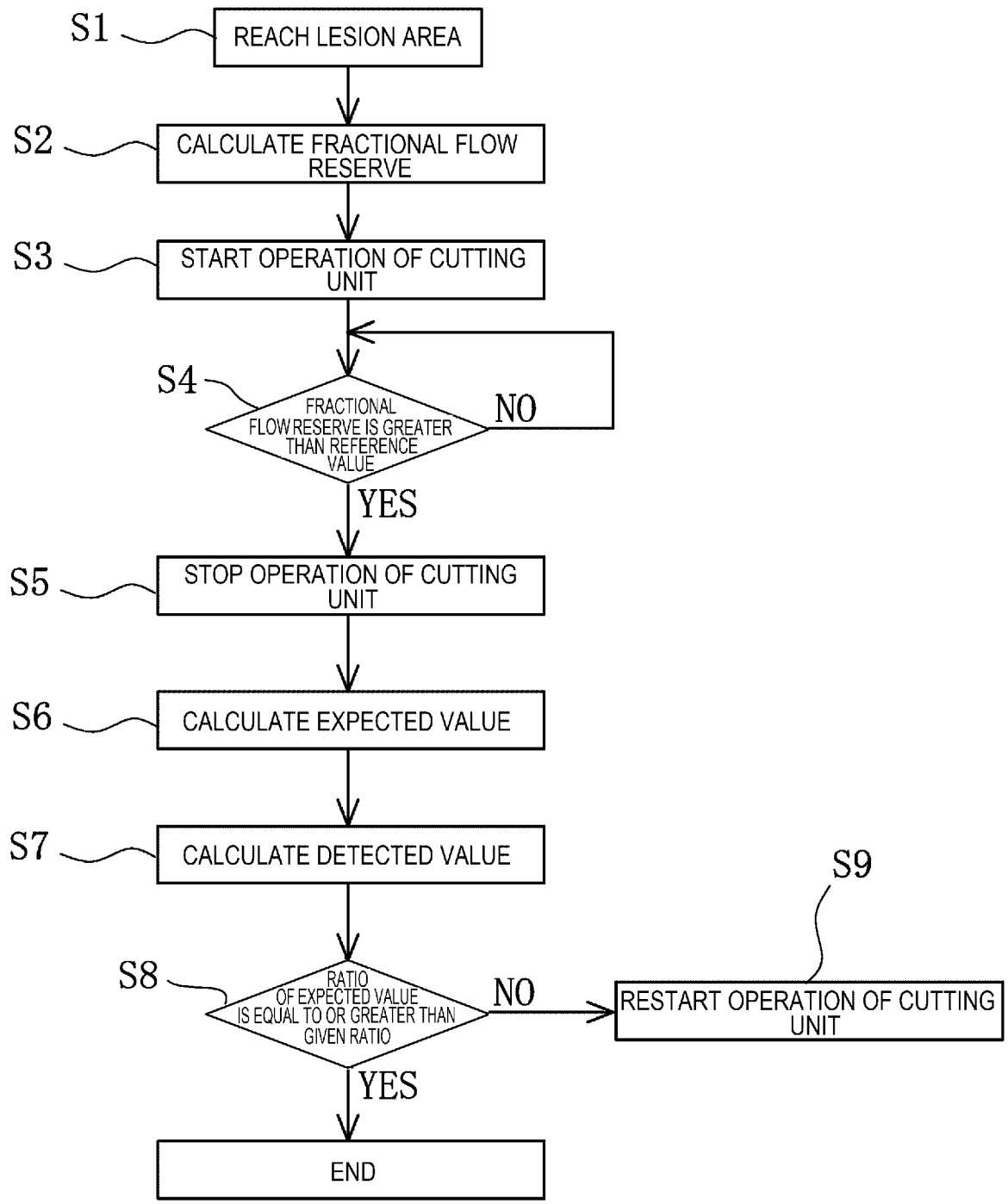

MEDICAL DEVICE

CROSS-REFERENCE TO RELATED APPLICATION(S)

This application is based on and claims the benefit of priority from Japanese patent application No. 2021-213849, filed Dec. 28, 2021, the entire contents of which are incorporated herein by reference.

BACKGROUND OF THE INVENTION

1. Field of the Invention

Embodiments described herein relate generally to a medical device for removing an object in a body cavity.

2. Description of the Related Art

Examples of treatment methods for a stenosed site caused by plaque, a thrombus, and the like in a blood vessel include a method of dilating the blood vessel by a balloon and a method of indwelling a mesh-like or coil-like stent in the blood vessel as a support for the blood vessel. However, it is difficult by these methods to treat a stenosed site that is hardened due to calcification, and a stenosed site that occurs in a bifurcated portion of the blood vessel. Examples of a method that can treat such sites include a method of cutting and removing stenotic objects such as plaque and a thrombus.

As medical devices to be used in such a treatment, a medical device with a cutting unit that rotates to cut an object in a blood vessel has been known. The medical device with the cutting unit includes a drive shaft including the cutting unit in a distal end portion, and a fluid lumen that aspirates the cut object. The drive shaft is connected to a rotation drive source such as a motor, and the fluid lumen is connected to a fluid drive source such as a pump.

SUMMARY OF THE INVENTION

In the cutting procedure, it needs to be checked whether an opening in a lesion area has a target size. The state of the lesion area is checked by injecting a contrast agent into a blood vessel and imaging the blood vessel with X-ray. Thus, repeating this procedure results in a complicated technique and an increase in the radiation exposure for a patient.

Embodiments provide a medical device capable of easily checking a state of a lesion area being cut and controlling an operation thereof.

In one embodiment, a medical device for removing an object in a body cavity, includes a first device including a rotatable drive shaft and a cutter attached to a distal end of the drive shaft and by which the object is cut, a second device movable with respect to the drive shaft along a longitudinal direction of the drive shaft and including a distal-side blood pressure sensor at a distal portion of the second device and a proximal-side blood pressure sensor on a proximal side of the distal-side blood pressure sensor, and a controller. The controller is configured to acquire a first measurement value from the distal-side blood pressure sensor and a second measurement value from the proximal-side blood pressure sensor, calculate a fractional flow reserve using the first and second measurement values, and control the cutter to cut the object in accordance with the calculated fractional flow reserve.

The medical device configured as the above can estimate a state of the lesion area being cut without imaging the lesion area.

BRIEF DESCRIPTION OF THE DRAWING

FIG. 6 is a flowchart of an operation of the medical device.

DESCRIPTION OF THE EMBODIMENTS

Figure 1:
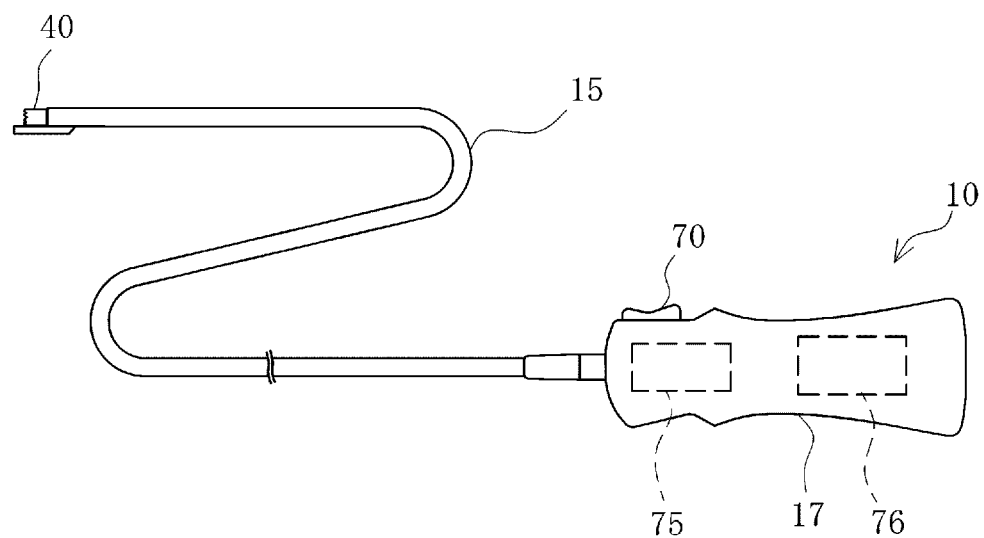
FIG. 1 is a front view of a medical device in an embodiment.

Hereinafter, embodiments of this disclosure will be described with reference to the drawings. Note that, the size ratios in the drawings may be exaggerated for convenience of explanation, and may be different from the actual ratios in some cases. In the present specification, a side of a medical device to be inserted into a body cavity is referred to as a "distal end" or a "distal side", and an operator-side at which the medical device is held by an operator is referred to as a "proximal end" or a "proximal side".

A medical device 10 according to an embodiment is inserted into a blood vessel, and is used in a procedure of cutting and removing a thrombus, plaque, atheroma, a calcified lesion, and the like, in acute limb ischemia and a deep venous thrombosis. Note that, an object to be removed by the medical device 10 is not necessarily limited to the thrombus, the plaque, the atheroma, and the calcified lesion, and can be any objects that may exist in a body cavity or body lumen.

Figure 2:
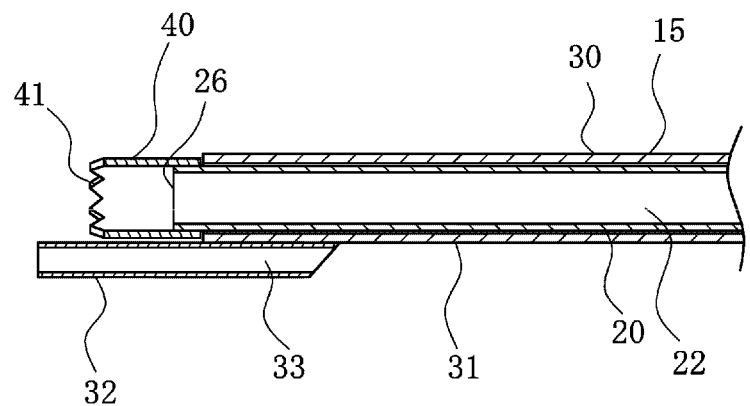
FIG. 2 is an enlarged cross-sectional view of the vicinity of a distal end portion of the medical device.

As illustrated in FIGS. 1 and 2, the medical device 10 includes a first device that includes a shaft portion 15 including an elongated drive shaft 20 that is rotationally driven, an outer tube 30 that surrounds the drive shaft 20, and a handle portion 17. The medical device 10 further includes a guide wire 50 serving as a second device illustrated in FIG. 3. The handle portion 17 is connected to a proximal portion of the shaft portion 15. A cutting unit 40 that cuts an object such as a thrombus is provided at a distal end portion of the drive shaft 20.

The drive shaft 20 transmits a rotation force to the cutting unit 40. In the drive shaft 20, a fluid lumen 22 for transporting a cut object to the proximal side is formed. The drive shaft 20 penetrates through the outer tube 30, and has the distal end portion to which the cutting unit 40 is fixed. The drive shaft 20 includes an inlet portion 26 into which debris (e.g., a cut thrombus or the like) that is an object to be aspirated enters, at the distal end.

In the handle portion 17, an operation unit 70 (e.g., one or more switches) with which an operation of the medical device 10 is performed is provided. Moreover, inside the handle portion 17, a rotation drive source 75 (e.g., a motor) that is connected to the shaft portion 15 and rotates the drive shaft 20, and an aspiration drive source 76 (e.g., a pump) that moves a fluid from the distal side to the proximal side of the fluid lumen 22 are provided.

The drive shaft 20 is flexible, and has characteristics of allowing the power of rotation to be transmitted from the proximal side to the distal side. The drive shaft 20 may include one member as a whole, or may include a plurality of members. The drive shaft 20 may include a spiral-shaped slit or groove to be formed by laser processing or the like, in order to adjust the rigidity thereof depending on a site. Moreover, the distal end portion and the proximal portion of the drive shaft 20 may include different members.

As a constituent material for the drive shaft 20, for example, stainless steel, a shape memory alloy such as a nickel titanium alloy, an alloy (e.g., silver solder component) including silver, copper, zinc, and the like, an alloy (e.g., solder component) including gold, tin, and the like, cemented carbide such as tungsten carbide, polyolefin such as polyethylene and polypropylene, polyamide, polyester such as polyethylene terephthalate, a fluorinated polymer such s tetrafluoroethylene ethylene copolymer (ETFE), polyether ether ketone (PEEK), polyimide, and the like can be used suitably. Moreover, the drive shaft 20 may include a plurality of materials, or a reinforcing member such as a wire rod may be embedded.

The outer tube 30 includes an outer tube main body 31 that surrounds the drive shaft 20 that is rotatable, and a distal end tube 32 that is fixed to a side surface of a distal end portion of the outer tube main body 31.

The distal end portion of the outer tube main body 31 is positioned on a proximal side of the cutting unit 40. The outer tube main body 31 is also rotatable to change the orientation of the cutting unit 40 toward an object to be removed. Moreover, the outer tube main body 31 may include a curved portion that is bent at a predetermined angle in the distal end portion. The curved portion is rotated by the outer tube main body 31, and thus can easily cause the cutting unit 40 to contact the object to be removed.

The distal end tube 32 is fixed to an outer peripheral surface of the distal end portion of the outer tube main body 31. The distal end tube 32 includes a distal end lumen 33 into which the guide wire 50 serving as a second device can be inserted. Accordingly, the medical device 10 is a rapid exchange type device in which the distal end lumen 33 through which the guide wire 50 is inserted is formed only in the distal end portion.

Constituent materials for the outer tube main body 31 and the distal end tube 32 are not specially limited, and for example, stainless steel, a shape memory alloy such as a nickel titanium alloy, titanium, an alloy (e.g., silver solder component) including silver, copper, zinc, and the like, an alloy (e.g., solder component) including gold, tin, and the like, cemented carbide such as tungsten carbide, polyolefin such as polyethylene and polypropylene, polyamide, polyester such as polyethylene terephthalate, or various kinds of elastomers, a fluorinated polymer such as ETFE, PEEK, polyimide, polyacetal, and the like, can be used suitably. Moreover, the outer tube main body 31 may include a plurality of materials, or a reinforcing member such as a wire rod may be embedded.

The cutting unit 40 is a cutter that cuts an object such as a thrombus, plaque, or calcified lesion to be small. Accordingly, "cutting" indicates that a force acts on an object to be contacted, or an energy acts on an object approaching, thereby making the object smaller. An acting method of a force in the cutting, and the shape and form of the object after the cutting are not limited. The cutting unit 40 has an enough strength to cut the above-mentioned object. The cutting unit 40 is fixed to the distal end portion of the drive shaft 20. The cutting unit 40 has a cylinder shape so as to protrude to the distal side from the drive shaft 20. The cutting unit 40 includes a sharp blade 41 at a distal end thereof. Note that, the shape of the blade 41 is not specially limited. The cutting unit 40 may include not the blade 41 but a large number of minute grinding particles. Moreover, the cutting unit 40 does not need to be rotatable and may be a member that emits laser.

A constituent material for the cutting unit 40 preferably has a strength to the extent that allows a thrombus to be cut, and for example, stainless steel, titanium, diamond, ceramics, a shape memory alloy such as a nickel titanium alloy, cemented carbide such as tungsten carbide, an alloy (e.g., silver solder component) including silver, copper, zinc, and the like, high-speed steel, an optical fiber, and the like can be used suitably. The constituent material for the cutting unit 40 may be resin such as polyether ether ketone (PEEK), or engineering plastic such as polyacetal.

Figure 3:
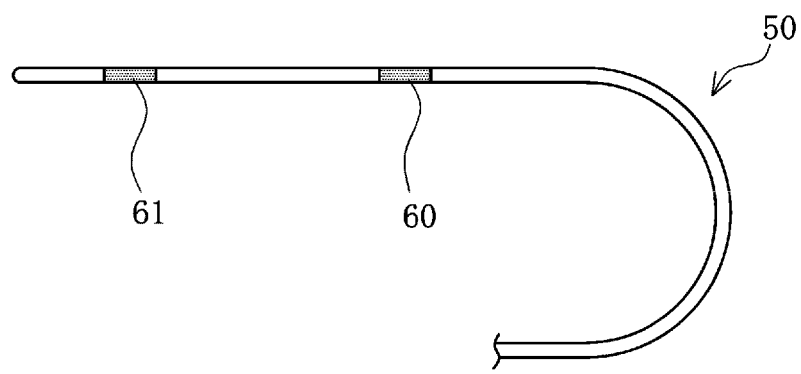
FIG. 3 is a front view of a second device used with the medical device.

As illustrated in FIG. 3, the guide wire 50 serving as a second device is an elongated wire rod having elasticity, is formed by wires being wound around a core wire. The core wire and the wound wires are formed of a metal material such as stainless steel. Note that, the guide wire 50 may be made of resin.

The guide wire 50 includes a proximal-side blood pressure sensor 60 and a distal-side blood pressure sensor 61 at positions separated from each other by a certain distance (e.g., 50 mm-500 mm) along the axial direction of the guide wire 50 at the distal portion thereof. The proximal-side blood pressure sensor 60 and the distal-side blood pressure sensor 61 can measure the blood pressure at the respective positions.

For example, known liquid pressure sensors can be embedded in the guide wire 50 as the proximal-side blood pressure sensor 60 and the distal-side blood pressure sensor 61. The guide wire 50 includes wires for supplying power to those sensors 60 and 61 and conveying measurement signals therefrom. Those wires are electrically connected to a power source and a control unit 72 of the handle portion 17 described later, at a proximal portion of the guide wire 50, for example. Alternatively, the wires for conveying the measurement signals may be connected to a wireless transmitter that can wirelessly communicate with the control unit 72.

Figure 4:
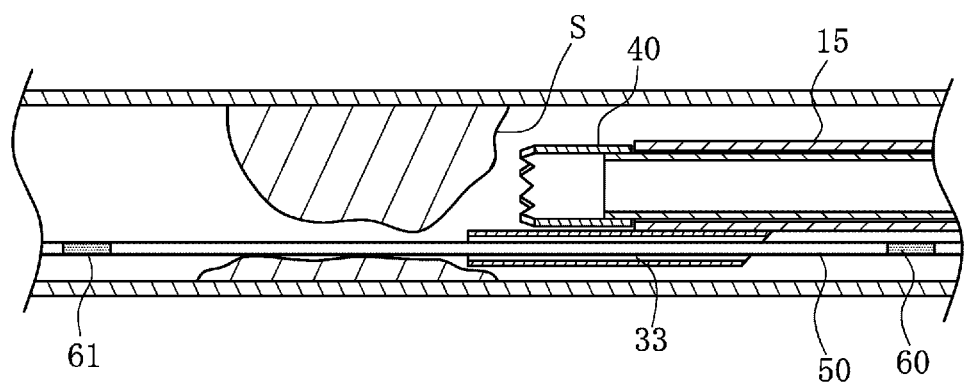
FIG. 4 is an enlarged cross-sectional view of the distal end portion of the medical device in a state where a shaft portion and the second device are present near a target position.

Before the shaft portion 15 is inserted into a blood vessel, the guide wire 50 is inserted into the blood vessel so that the distal end portion the guide wire 50 reaches and passes near a lesion area S. As illustrated in FIG. 4, in this state, the proximal-side blood pressure sensor 60 is positioned at the proximal side from the distal end lumen 33 and at the proximal side from the lesion area S, and the distal-side blood pressure sensor 61 is positioned at the distal side from the distal end lumen 33 and at the distal side from the lesion area S. The shaft portion 15 is inserted into the blood vessel and moved toward the lesion area S in a state where the guide wire 50 is inserted through the distal end lumen 33, so that the cutting unit 40 is positioned in the vicinity of the lesion area S.

Figure 5:
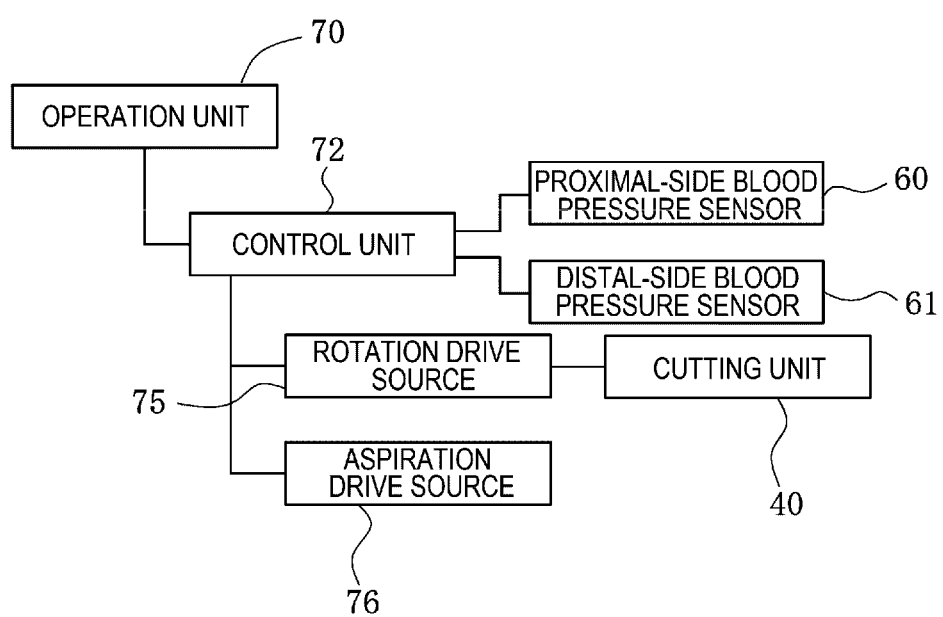
FIG. 5 is a hardware block diagram of the medical device.

As illustrated in FIG. 5, the medical device 10 includes a control unit 72 that is a control circuit or a processor connected to the operation unit 70 and the blood pressure sensors 60 and 61. The control unit 72 is connected to the rotation drive source 75 and the aspiration drive source 76, and controls the operations thereof based on signals from the operation unit 70 and the blood pressure sensors 60 and 61. The rotation drive source 75 can cause the cutting unit 40 to rotationally operate via the drive shaft 20 as mentioned in the foregoing.

The operation control of the cutting unit 40 by the control unit 72 will be described. As illustrated in FIG. 6, the guide wire 50 is firstly inserted into the vicinity of the lesion area S, and the proximal-side blood pressure sensor 60 is disposed at the proximal side from the lesion area S and the distal-side blood pressure sensor 61 is disposed at the distal side from the lesion area S. Next, the shaft portion 15 in which the guide wire 50 is inserted through the distal end lumen 33 is entered into the blood vessel to cause the cutting unit 40 to reach the vicinity of the lesion area S, as mentioned in the foregoing (S1).

The control unit 72 acquires measurement values from the proximal-side blood pressure sensor 60 and the distal-side blood pressure sensor 61 in the state of FIG. 4, and calculates a fractional flow reserve FFR from these values (S2). The fractional flow reserve FFR can be calculated as FFR=Pd/Pa where Pa is a blood pressure at the proximal side from the lesion area S measured by the proximal-side blood pressure sensor 60, and Pd is a blood pressure at the distal side from the lesion area S measured by the distal-side blood pressure sensor 61. In a case where a stenosis by the lesion area S is not present, FFR=1 is obtained. After having calculated the fractional flow reserve FFR, the control unit 72 starts aspiration by the aspiration drive source 76, and starts the operation of the cutting unit 40 by causing the rotation drive source 75 to operate (S3).

After having started the operation of the cutting unit 40, the control unit 72 calculates the fractional flow reserve FFR as needed, and determines whether the calculated fractional flow reserve FFR is greater than a reference value (S4). Generally, it is determined that ischemia is present in a case of FFR≤0.75, it is determined that ischemia is not present in a case of FFR≥0.80, and it is determined as a boundary state in 0.75<FFR<0.80. Thus, the reference value of the fractional flow reserve FFR is set to a range from 0.75 to 0.80. Further, the reference value is not limited to a preset value, but for example, a reference value may be calculated using artificial intelligence (AI) technologies based on information on states of the blood vessel and the lesion area S detected by a pre-diagnosis. Accordingly, the reference value can be set flexibly in accordance with the situations of the blood vessel and the lesion area S.

The aspiration is also performed during the operation of the cutting unit 40, so that a blood pressure that is measured by the proximal-side blood pressure sensor 60 is lower than an original blood pressure. Accordingly, the control unit 72 may correct the blood pressure measured by the proximal-side blood pressure sensor 60 in accordance with the aspiration amount. In the correction, a difference between a blood pressure measured by the proximal-side blood pressure sensor 60 before the operation of the aspiration drive source 76 and a blood pressure measured by the proximal-side blood pressure sensor 60 after the operation of the aspiration drive source 76 has started may be used, or a relation between the aspiration amount and the pressure drop obtained by a pre-experiment may be used.

If the fractional flow reserve FFR is equal to or less than the reference value at S4, the control unit 72 continues the operation of the cutting unit 40. If the fractional flow reserve is greater than the reference value at S4, the control unit 72 stops the operation of the cutting unit 40 (S5). Accordingly, without imaging the lesion area S, it is possible to progress the cutting of the lesion to the level at which the blood flow is recovered, and to prevent the cutting unit 40 from excessively cutting the lesion area S. The control unit 72 may change a rotational frequency of the cutting unit 40 based on the hardness of the blood vessel in the lesion area S, during the operation of the cutting unit 40. The hardness of the blood vessel in the lesion area S can be evaluated by calculating a ratio between a first fractional flow reserve FFR that is a fractional flow reserve in the vasodilatation and a second fractional flow reserve FFR that is a fractional flow reserve in the vasoconstriction. If this value is smaller than a certain value (i.e., a difference in the fractional flow reserve FFR between at the vasodilatation and at the vasoconstriction is small), the control unit 72 determines that the blood vessel is in a hard state, and raises the rotational frequency of the cutting unit 40. On the other hand, if the ratio between the first fractional flow reserve FFR and the second fractional flow reserve FFR is greater than a certain value, the control unit 72 determines that the blood vessel is not in a hard state, and maintains or lowers the rotational frequency of the cutting unit 40. Accordingly, it is possible to cut the lesion area S more effectively.

S6 and subsequent steps can be performed arbitrarily. After having stopped the operation of the cutting unit 40, the control unit 72 calculates, based on the degree of occlusion by the lesion area S based on the pre-diagnosis and the cumulative rotational frequency of the cutting unit 40, an expected value of the degree of occlusion in the lesion area S after the cutting (S6). Next, after an ultrasound catheter or the like is into the vicinity of the lesion area S, the control unit 72 acquires from the ultrasound catheter a detected value of the degree of occlusion in the lesion area S after the cutting, which serves as measurement information on the lesion area S (S7).

The control unit 72 compares the expected value calculated at S6 with the detected value acquired at S7, and determines whether the ratio of the expected value relative to the detected value is equal to or greater than a given ratio (S8). If the ratio of the expected value relative to the detected value is equal to or greater than a given ratio, the control unit 72 regards the lesion area S as having been actually cut not less than the certain level, and ends the procedure by the cutting unit 40. If the ratio of the expected value relative to the detected value does not reach the given ratio, the control unit 72 regards the lesion area S as having not actually cut sufficiently, and restarts the operation of the cutting unit 40 (S9). Accordingly, it is possible to conduct the cutting of the stenosed lesion area S more reliably.

As is in the foregoing, the medical device 10 according to the present embodiment includes: a first device including the elongated shaft portion 15, and the cutting unit 40 that is provided at a distal end portion of the shaft portion 15; and a second device that is movable relative to an axial direction of the shaft portion 15, includes the distal-side blood pressure sensor 61 and the proximal-side blood pressure sensor 60, and detects, in a state where the distal-side blood pressure sensor 61 is disposed at a distal side from the lesion area S and the proximal-side blood pressure sensor 60 is disposed at a proximal side from the lesion area S, a fractional flow reserve FFR from the measurement values measured by the distal-side blood pressure sensor 61 and a measurement value by the proximal-side blood pressure sensor 60. The medical device 10 includes the control unit 72 that controls an operation of the cutting unit 40, and the control unit 72 controls the operation of the cutting unit 40 in accordance with the fractional flow reserve FFR or performs notification control described later. The medical device 10 configured in this manner can check the state of the lesion area S being cut without imaging the lesion area S and properly control the cutting unit 40 depending on the state of the lesion area S.

Moreover, the control unit 72 may stop the operation of the cutting unit 40 when the fractional flow reserve FFR has become greater than a reference value. Accordingly, the cutting unit 40 is automatically stopped in a situation where the cutting of the lesion area S is estimated to be sufficiently progressed, so that it is possible to prevent from the lesion area S to be excessively cut.

Moreover, the control unit 72 may acquire measurement information on the lesion area S after having stopped the cutting unit 40, and determine whether to restart the operation of the cutting unit 40 based on the measurement information. Accordingly, it is possible to restart the operation of the cutting unit 40 based on the actual state of the lesion area S in a case where the cutting is insufficient, and to conduct the more reliable cutting.

Moreover, the aspiration drive source 76 that makes aspiration from the distal end portion of the shaft portion 15 may be further included, and the control unit 72 may detect the fractional flow reserve FFR after having corrected the measurement value by the proximal-side blood pressure sensor 60 based on an aspiration amount by the aspiration drive source 76. Accordingly, it is possible to calculate the fractional flow reserve FFR more accurately, and thus to perform the cutting by the cutting unit 40 more reliably.

Moreover, the control unit 72 may detect a first fractional flow reserve FFR that is the fractional flow reserve during vasodilatation and a second fractional flow reserve FFR that is the fractional flow reserve during vasoconstriction based on the images obtained by a ultrasound catheter, and may change a rotational frequency of the cutting unit 40 in accordance with a ratio between the first fractional flow reserve FFR and the second fractional flow reserve FFR. Accordingly, it is possible to evaluate the hardness of the blood vessel, and perform the effective cutting in accordance with the hardness.

Note that, this disclosure is not limited to the above-described embodiment, but various changes by those skilled in the art can be made within the technical scope of this disclosure.

In the above-mentioned embodiment, the control unit 72 stops the operation of the cutting unit 40 when the fractional flow reserve FFR has become greater than a reference value. Alternatively, the control unit 72 may perform notification control by causing one or more lamps (e.g., LED) or a speaker (not illustrated) to emit light or sound instead of stopping the operation of the cutting unit 40. The lamps or the speaker may be disposed along the housing of the handle portion 17. The operator can grasp the lesion area S having been sufficiently cut with the notification, and can stop the operation of the cutting unit 40 by operating the operation unit 70.

In the above-mentioned embodiment, the proximal-side blood pressure sensor 60 and the distal-side blood pressure sensor 61 may be pressure sensors, but may be sensors of another type such as thermal blood flow sensors. In a case where the thermal blood flow sensors are used, the blood flow becomes a turbulent flow with the rotation of the cutting unit 40, so that the measurement values may be corrected by this influence being considered.

In the above-mentioned embodiment, the second device is the guide wire 50, but may be another device other than the guide wire 50.

In the above-mentioned embodiment, the operator operates the medical device 10 to deliver the cutting unit 40 to the lesion area, and causes the cutting unit 40 to operate, but this disclosure may be applied to a robot catheter that automatically conducts these operations.

In the above-mentioned embodiment, the guide wire 50 is a second device including the distal-side blood pressure sensor 61 and the proximal-side blood pressure sensor 60, but either one or both of the distal-side blood pressure sensor 61 and the proximal-side blood pressure sensor 60 may be provided to another device other than the guide wire 50, and the second device may include the another device. For example, the distal-side blood pressure sensor 61 may be provided to the guide wire 50, and the proximal-side blood pressure sensor 60 may be provided to another catheter such as a guiding catheter.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A medical device for removing an object in a body cavity, comprising:
    a first device including a rotatable drive shaft and a cutter attached to a distal end of the drive shaft and by which the object is cut;
    a second device movable with respect to the drive shaft along a longitudinal direction of the drive shaft and including a distal-side blood pressure sensor at a distal portion of the second device and a proximal-side blood pressure sensor on a proximal side of the distal-side blood pressure sensor; and
    a controller configured to:
        acquire a first measurement value from the distal-side blood pressure sensor and a second measurement value from the proximal-side blood pressure sensor,
        calculate a fractional flow reserve using the first and second measurement values, and
        control the cutter to cut the object in accordance with the calculated fractional flow reserve, wherein
    the controller is further configured to:
        control the cutter to stop when the fractional flow reserve is greater than a reference value, and
        after the cutter is stopped, calculate a first amount of the cut object using a total number of rotations of the cutter, and determine whether to restart the cutter based on the calculated first amount of the cut object.

2. The medical device according to claim 1, wherein the controller is configured to calculate a second amount of the cut object from an amount of the object remaining in the body cavity, and determine to restart the cutter when a ratio of the calculated first amount to the calculated second amount is less than a given ratio.

3. The medical device according to claim 1, wherein the controller is configured to issue a notification signal when the fractional flow reserve is greater than the reference value.

4. The medical device according to claim 1, further comprising:
    an aspiration drive source configured to aspirate a body fluid including the cut object through a lumen of the drive shaft, wherein
    the controller is configured to correct the second measurement value based on an amount of the aspirated fluid before calculating the fractional flow reserve.

5. The medical device according to claim 1, wherein the controller is configured to:

calculate a first fractional flow reserve using measurement values measured by the distal-side and proximal-side blood pressure sensors during vasodilatation, calculate a second fractional flow reserve using measurement values measured by the distal-side and proximal-side blood pressure sensors during vasoconstriction, and control a rotational frequency of the cutter in accordance with a ratio of the first fractional flow reserve to the second fractional flow reserve.

6. The medical device according to claim 1, wherein the second device includes a guide wire that can pass through a guide wire lumen formed at the distal end of the drive shaft.

7. The medical device according to claim 1, further comprising:
a handle to which a proximal end of the drive shaft is connected and including the controller.

8. The medical device according to claim 1, wherein the distal-side blood pressure sensor is separated from the proximal-side blood pressure sensor by 50 to 500 mm.

9. A method for removing an object in a body cavity using a medical device that includes:
a first device including a rotatable drive shaft and a cutter attached to a distal end of the drive shaft and by which the object is cut, and a second device movable with respect to the drive shaft along a longitudinal direction of the drive shaft and including a distal-side blood pressure sensor at a distal portion of the second device and a proximal-side blood pressure sensor on a proximal side of the distal-side blood pressure sensor, the method comprising:

acquiring a first measurement value from the distal-side blood pressure sensor and a second measurement value from the proximal-side blood pressure sensor;

calculating a fractional flow reserve using the first and second measurement values; and controlling the cutter to cut the object in accordance with the fractional flow reserve, wherein controlling includes stopping the cutter when the fractional flow reserve is greater than a reference value, and the method further comprises, after the cutter is stopped, calculating a first amount of the cut object using a total number of rotations of the cutter, and determining whether to restart the cutter based on the calculated first amount of the cut object.

10. The method according to claim 9, further comprising:
calculating a second amount of the cut object from an amount of the object remaining in the body cavity; and determining to restart the cutter when a ratio of the calculated first amount to the calculated second amount is less than a given ratio.

11. The method according to claim 9, further comprising:
issuing a notification signal when the fractional flow reserve is greater than the reference value.

12. The method according to claim 9, further comprising:
aspirating a body fluid including the cut object through a lumen of the drive shaft; and correcting the second measurement value based on an amount of the aspirated fluid before calculating the fractional flow reserve.

13. The method according to claim 9, further comprising:
calculating a first fractional flow reserve using measurement values measured by the distal-side and proximal-side blood pressure sensors during vasodilatation;

calculating a second fractional flow reserve using measurement values measured by the distal-side and proximal-side blood pressure sensors during vasoconstriction; and controlling a rotational frequency of the cutter in accordance with a ratio of the first fractional flow reserve to the second fractional flow reserve.

14. A medical device for removing an object in a body cavity, comprising:
a rotatable drive shaft;

a cutter attached to a distal end of the drive shaft and by which the object is cut;

a guide wire including a distal-side blood pressure sensor at a distal portion thereof and a proximal-side blood pressure sensor on a proximal side of the distal-side blood pressure sensor;

a guide tube disposed at a distal portion of the drive shaft and including a lumen through which the guide wire can pass; and a controller configured to:
acquire a first measurement value from the distal-side blood pressure sensor and a second measurement value from the proximal-side blood pressure sensor, calculate a fractional flow reserve using the first and second measurement values, and control the cutter in accordance with the fractional flow reserve, wherein the controller is further configured to:
control the cutter to stop when the fractional flow reserve is greater than a reference value, and after the cutter is stopped, calculate a first amount of the cut object using a total number of rotations of the cutter, and determine whether to restart the cutter based on the calculated first amount of the cut object.

* * * * *